US010260597B2

(12) United States Patent
Kutsen

(10) Patent No.: US 10,260,597 B2
(45) Date of Patent: Apr. 16, 2019

(54) SWIVEL DEVICE AND METHOD OF USE THEREOF

(71) Applicant: Gregory Kutsen, Seabrook, TX (US)

(72) Inventor: Gregory Kutsen, Seabrook, TX (US)

(*) Notice: Subject to any disclaimer, the term of this patent is extended or adjusted under 35 U.S.C. 154(b) by 378 days.

(21) Appl. No.: 15/006,690

(22) Filed: Jan. 26, 2016

(65) Prior Publication Data
US 2017/0211661 A1 Jul. 27, 2017

(51) Int. Cl.
*F16G 15/08* (2006.01)
*B23P 19/04* (2006.01)

(52) U.S. Cl.
CPC .............. *F16G 15/08* (2013.01); *B23P 19/04* (2013.01)

(58) Field of Classification Search
CPC .......... F16G 15/04–15/08; B23P 19/04; Y10T 403/32213; Y10T 403/32221; Y10T 403/32975; Y10T 403/32983
USPC .................................... 403/78, 79, 164, 165
See application file for complete search history.

(56) References Cited

U.S. PATENT DOCUMENTS

| | | | | |
|---|---|---|---|---|
| 2,519,460 A * | 8/1950 | Hansen | ................... | F16G 15/08 403/78 |
| 2,625,005 A * | 1/1953 | Myers | ...................... | B66C 1/34 294/82.1 |
| 3,504,937 A * | 4/1970 | Panovic | .................. | F16G 15/08 403/164 |
| 3,995,822 A * | 12/1976 | Einhorn | ................... | F16B 45/00 24/698.1 |
| 4,037,978 A * | 7/1977 | Connelly | .................. | F16B 7/04 403/164 |
| 4,080,782 A * | 3/1978 | Colecchio | ............... | B21L 13/00 254/258 |
| 4,482,264 A * | 11/1984 | Kodera | ................... | A01K 91/03 403/165 |
| 4,577,374 A * | 3/1986 | Lii | ......................... | A44B 11/28 24/165 |
| 4,600,331 A * | 7/1986 | Gray | ....................... | F16G 15/08 403/165 |
| 4,708,382 A * | 11/1987 | LaCount | ................... | B66C 1/34 294/82.1 |

(Continued)

FOREIGN PATENT DOCUMENTS

| | | | | |
|---|---|---|---|---|
| DE | 202015104747 | * | 9/2015 | ............. F16G 15/08 |
| EP | 2169260 A1 | * | 3/2010 | ............. F16G 15/08 |
| WO | WO 9637715 A1 | * | 11/1996 | ............. B66C 1/125 |

*Primary Examiner* — Amber R Anderson
*Assistant Examiner* — Nahid Amiri
(74) *Attorney, Agent, or Firm* — Richard J. Hepner

(57) ABSTRACT

A high-strength swivel device for transferring axial tension load while avoiding transfer of side loads may comprise a swivel chain connector having a swivel chain connector head and a swivel chain connector clevis, a clevis pin for capturing the terminal link of a chain within said swivel chain connector clevis; a swivel body comprising a first swivel body half and a second swivel body half, said swivel body designed and configured to capture said swivel chain connector head within the swivel device such that the swivel chain connector head may rotate within, and transfer axial loads through the swivel device; a collar for capturing the first and second swivel body halves, the swivel chain connector and the clevis pin into a structural subassembly; and a connection flange designed and configured to enable attachment of an anchor to the swivel device.

9 Claims, 5 Drawing Sheets

(56) References Cited

U.S. PATENT DOCUMENTS

| | | | | |
|---|---|---|---|---|
| 4,955,749 A * | 9/1990 | Panovic | ............... | F16G 15/08 403/11 |
| 5,248,176 A * | 9/1993 | Fredriksson | ............ | B66C 1/34 248/499 |
| 5,927,780 A * | 7/1999 | Chandler | ............... | B66C 1/18 294/74 |
| 6,457,896 B1 * | 10/2002 | deDoes | ............... | A01K 27/005 285/2 |
| 6,478,350 B2 * | 11/2002 | Zuliani | ............... | B66C 1/66 294/215 |
| 6,491,329 B1 * | 12/2002 | Smith | ............... | B66C 1/34 294/215 |
| 6,694,574 B1 * | 2/2004 | Sheng | ............... | F16G 15/08 24/265 H |
| 7,841,629 B2 * | 11/2010 | Hoffmann | ............ | F16L 37/088 285/276 |
| 2009/0208274 A1 * | 8/2009 | Liang | ............... | F16G 15/08 403/164 |
| 2011/0023406 A1 * | 2/2011 | Todd, IV | ............... | E04H 3/28 52/655.1 |

* cited by examiner

SWIVEL DEVICE AND METHOD OF USE THEREOF

FIELD OF THE INVENTION

The present invention relates generally to the field of swivels. More particularly, the present invention provides a useful and novel apparatus for transferring axial tension load through a high-strength swivel device while avoiding transfer of side loads.

BACKGROUND OF THE INVENTION

The material in this patent document is subject to copyright protection under the copyright laws of the United States and other countries. The copyright owner grants a limited license to any member of the public to reproduce the patent document as it appears in official governmental records. All other copyright rights are reserved.

Generally, a swivel is a device employed to couple two parts into a single assembly while enabling one of the parts to rotate with respect to the other part.

The present invention is a novel swivel device for simultaneously 1) enabling rotation of a first structural element with respect to a second structural element, 2) bearing and transferring an axial tension load between said first structural element and said second structural element, and 3) preventing the transfer of non-axial bending or lateral loads between said first structural element and said second structural element. In addition, the swivel device of the present invention is designed and configured to be structurally efficient; maximizing the strength-to-size ratio of the swivel device.

The swivel device of the present invention is useful to, and has particular advantages to the field of marine anchoring systems. However, the usefulness and advantages of the swivel device of the present invention are applicable to any application wherein it is desirable to transfer axial tension loads while reducing or eliminating non-axial bending and sheer loads by means of a structurally strong and efficient swivel device.

SUMMARY OF THE INVENTION

In view of the limitations and disadvantages inherent to the conventional apparatus in the related art, the present invention provides a useful and novel apparatus [hereinafter "swivel device"] for transferring axial tension load through a high-strength swivel device while avoiding transfer of side loads.

One object of the swivel device of the present invention is to enable rotation of a first structural element with respect to a second structural element. In the present invention, the head of a swivel chain connector is captured within the head capture channel of a swivel body, allowing the swivel chain connector to rotate relative to the swivel body while transferring axial loads between the swivel chain connector and the swivel body.

Another object of the swivel device of the present invention is to minimize lateral loading upon the swivel, as application of non-axial bending or lateral loads is the principal failure mode of a swivel. The present invention is designed and installed such that lateral forces cannot be applied across the swivel joint by attaching to a link of a chain (that cannot transfer lateral loads) at one end, and to a shackle, or an equivalent mechanical attachment device that is designed to prevent the transfer of lateral loads, at the other end.

A further object of the swivel device of the present invention is to provide a structurally efficient device and to maximize the strength-to-weight ratio of the device. This object includes providing a swivel device design that may exceed the strength of a high-strength steel anchor chain. The present invention may be manufactured employing high-strength materials for load bearing structural elements. The present invention comprises a one-piece collar to clamp the components of the swivel device into a strong assembly, and to capture and constrain the clevis pin in place. Further, the clevis pin may have an oblong cross-section to maximize the cross-section and strength of the clevis pin. Further still, the invention may have two chain link seats incorporated into the swivel chain connector that function to mechanically seat the link adjacent to the terminal link of an anchor chain into the swivel chain connector, thereby allowing the terminal link to be rigidly captured deep within the swivel chain connector clevis of the swivel chain connector, maintaining a structurally rigid and strong interface between the swivel device and an anchor chain.

Other objects, aspects and advantages of the present invention will become readily apparent to those with skill in the art from the following figures, descriptions and claims. As will be appreciated by those with skill in the related art, the invention may be implemented in a plurality of equivalent embodiments. Such alternative embodiments, and their attendant objects, aspects and advantages, are within the scope of the present invention and, therefore, the examples set forth herein shall not be limiting.

BRIEF DESCRIPTION OF THE DRAWINGS

The nature of this invention, as well as all its objects, aspects and advantages, will become readily apparent and understood upon reference to the following detailed description when considered in conjunction with the accompanying drawings, in which like reference numerals designate like parts throughout the figures thereof, and wherein.

DETAILED DESCRIPTION OF THE INVENTION

The following description is provided to enable a person skilled in the relevant art to make and use the invention, and sets forth the best modes contemplated by the inventor of carrying out the invention. The present invention shall not be limited to the examples disclosed. Rather, the scope of the invention shall be as broad as the claims will allow.

Various inventive features are described below that may each be used independently of one another or in combination with other features. However, any single inventive feature may not address any of the disadvantages or objects discussed above, or might address only one of the disadvantages or objects discussed above. Further, one or more of the disadvantages or objects discussed above may not be fully addressed by any of the features described below.

Figure 1:
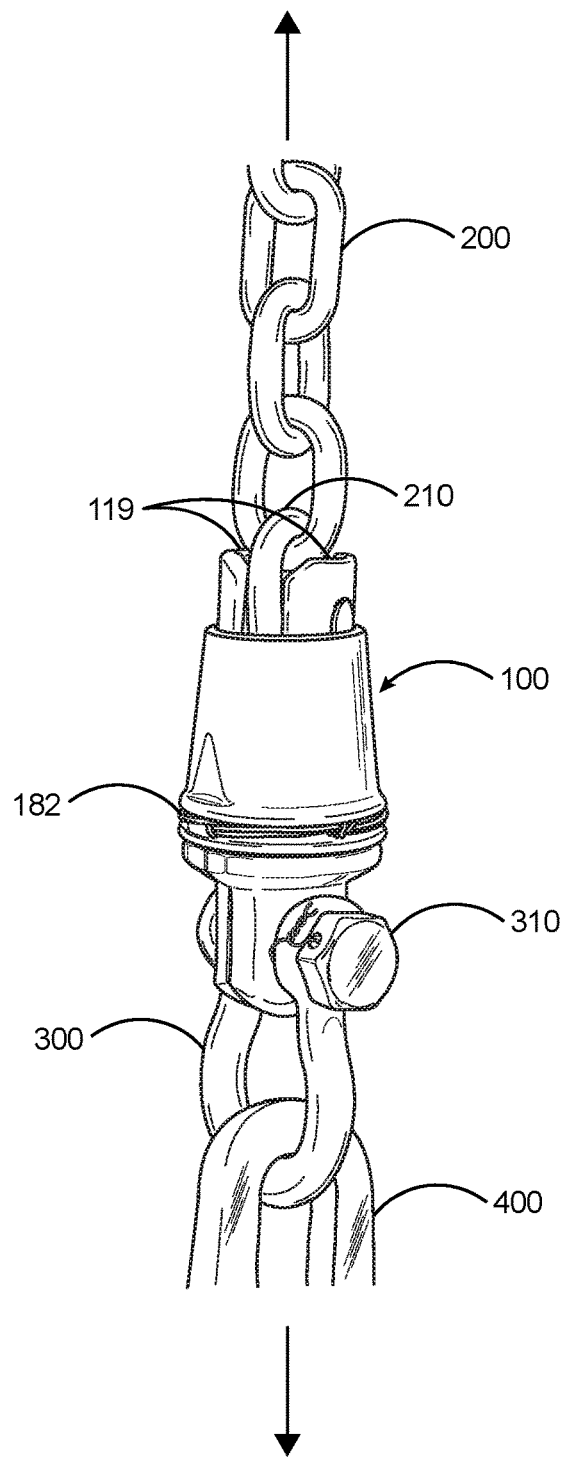
FIG. 1 presents a side perspective view of a swivel device 100 shown in use according to one exemplary embodiment of the present invention.

Referring now to the drawings, FIG. 1 presents a side perspective view of a swivel device 100 shown in use according to one exemplary embodiment of the present invention. The specific use presented in FIG. 1 is that of attaching an anchor chain 200 to an anchor 400. As illustrated in FIG. 1, the terminal link 210 of an anchor chain 200 may be attached at one end of the swivel device 100. The shaft of an anchor 400 may be attached to the other end of the swivel device 100 by any practical means. As shown in FIG. 1, one such practical means may be a shackle 300 having a shackle pin 310.

Figure 2:
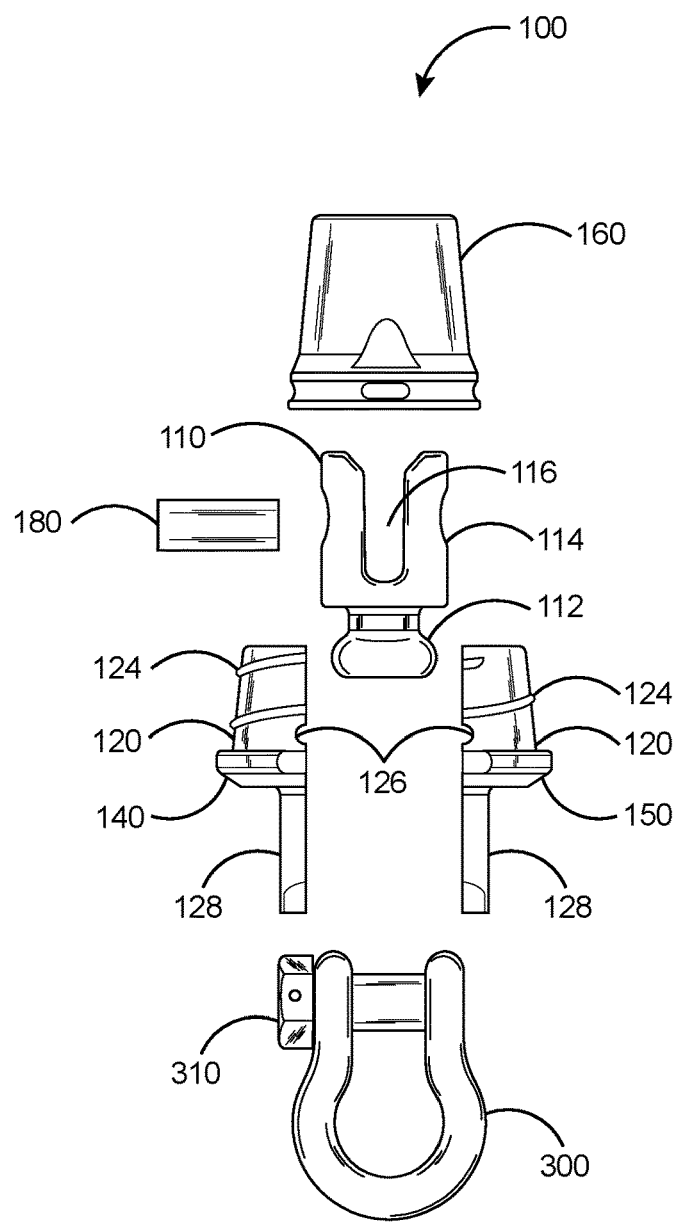
FIG. 2 presents an exploded side view of the swivel device 100 of FIG. 1.

FIG. 2 presents an exploded side view of the swivel device 100 of FIG. 1. The swivel device 100 may comprise a swivel chain connector 110, a swivel body 120 comprised of a first swivel body half 140 and a second swivel body half 150, a collar 160 and a clevis pin 180. In one alternative embodiment of the invention, a shackle 300 having a shackle pin 310 may be an integral component of the swivel device.

Figure 3:
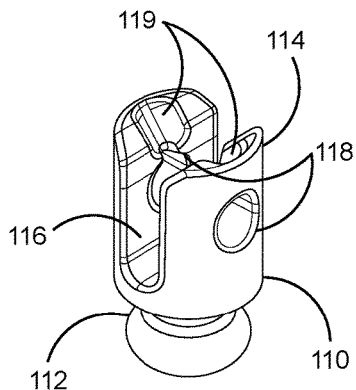
FIG. 3 presents a detail perspective view of the swivel chain connector 110 of the swivel device 100 of FIG. 1.

FIG. 3 presents a detail perspective view of the swivel chain connector 110 of the swivel device 100 of FIG. 1. The swivel chain connector 110 is generally cylindrical in shape to permit rotation of the swivel chain connector 110 within the swivel device 100. The swivel chain connector 110 may have a swivel chain connector clevis 114 portion that forms a clevis channel 116, and a swivel chain connector head 112 portion designed and configured to be captured and rotate within the swivel device 100. The swivel chain connector 110 may have clevis pin holes 118 to accommodate installation of the clevis pin 180 into the swivel chain connector 110. The swivel chain connector 110 may have chain link seats 119 that function to mechanically seat the link adjacent to the terminal link 210 of an anchor chain 200 into the swivel chain connector 110, thereby allowing the terminal link 210 to be rigidly and strongly captured deep within the swivel chain connector clevis 114 of the swivel chain connector 110. FIG. 1 illustrates how the terminal link 210 sits deeply into the swivel device 110 by mean of the chain link seats 119.

Figure 4:
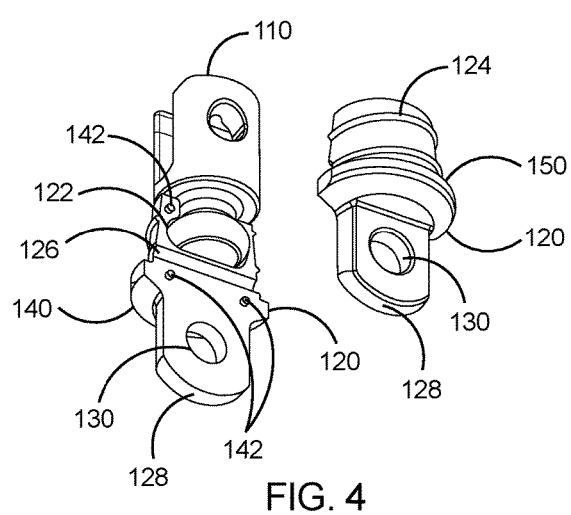
FIG. 4 presents a partially-exploded perspective view illustrating the subassembly of a swivel body 120 onto a swivel chain connector 110 of the swivel device 100 of FIG. 1.

FIG. 4 presents a partially-exploded perspective view illustrating the subassembly of the swivel body 120 onto the swivel chain connector 110 of the swivel device 100 of FIG. 1.

The swivel body 120 may be comprised of a first swivel body half 140 and a second swivel body half 150 which, when assembled as shown in FIGS. 1 and 4, form a head capture channel 122, an external thread 124, a lock wire passage 126, a connection flange 128, and a connection flange attachment hole 130. The first swivel body half 140 may have one or more alignment pins 142, and the second swivel body half 150 may have one or more alignment holes (not shown) such that, when the first swivel body half 140 and the second swivel body half 150 are assembled, the one or more alignment pins 142, and the one or more alignment holes may cooperate to align the first swivel body half 140 and the second swivel body half 150.

Upon assembly, the swivel chain connector head 112 may be captured in the head capture channel 122 such that the swivel chain connector 110 may rotate within the swivel body 120 (about the axis of the applied tension load between the anchor chain 200 and the anchor 400) while, at the same time, transferring the applied tension load between the swivel chain connector 110 and the swivel body 120.

Figure 5:
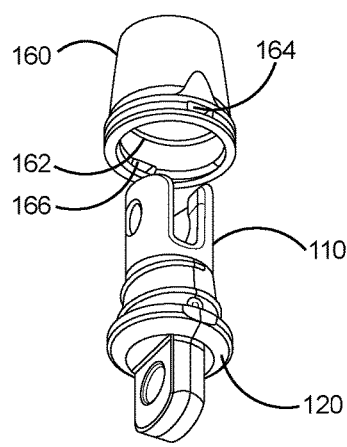
FIG. 5 presents a partially-exploded perspective view illustrating the subassembly of a collar 160 to the subassembly comprising a swivel chain connector 110 and a swivel body 120 of the swivel device 100 of FIG. 1.

FIG. 5 presents a partially-exploded perspective view illustrating the subassembly of the collar 160 onto the subassembly comprising the swivel chain connector 110 and the swivel body 120 of the swivel device 100 of FIG. 1.

Figure 6:
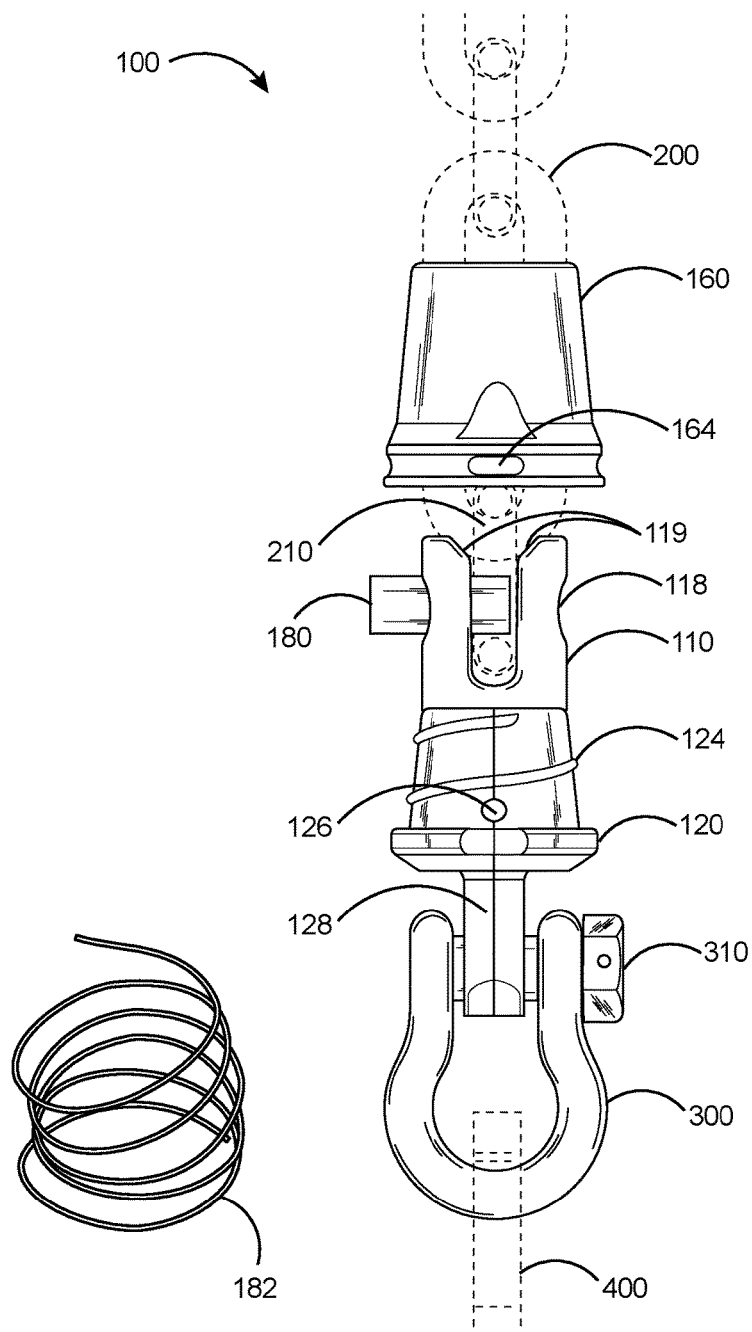
FIG. 6 presents a partially-exploded side view illustrating the assembly of the swivel device 100 of FIG. 1.

FIG. 6 presents a partially-exploded side view illustrating the assembly and use of the swivel device 100 of FIG. 1. A method of assembling and using the swivel device 100 may comprise the steps of:
 a) Providing an anchor chain 200 having a terminal link 210;
 b) Providing an anchor 400;
 c) Providing a swivel device 100;
 d) Inserting the terminal link 210 into the clevis channel 116 of the swivel chain connector 110;
 e) Inserting the clevis pin 180 through the clevis pin holes 118 and the terminal link 210 such that the clevis pin 180 captures the terminal link 210 within the clevis channel 116;
 f) Capturing the swivel chain connector head 112 between the first swivel body half 140 and the second swivel body half 150 of the swivel body 120;
 g) Sliding the collar 160 over the assembled swivel chain connector 110 and swivel body 120, twisting the collar 160 in order to engage the collar internal thread 162 onto the swivel body external thread 124, thereby clamping the first swivel body half 140 and the second swivel body half 150 together, and capturing the clevis pin 180 in place within the clevis pin holes 118;
 h) Installing a lock wire 182 through the first collar locking channel 164, the lock wire passage 126, and the second collar locking channel 166, successively (resulting in the lock wire 182 installation as illustrated in FIG. 1), thereby preventing the collar 160 from unthreading and loosening from the swivel body 120;
 i) Mechanically attaching the anchor 400 to the connection flange 128 of the swivel device 100 by means of a shackle 300 or equivalent attachment means.

Figure 7:
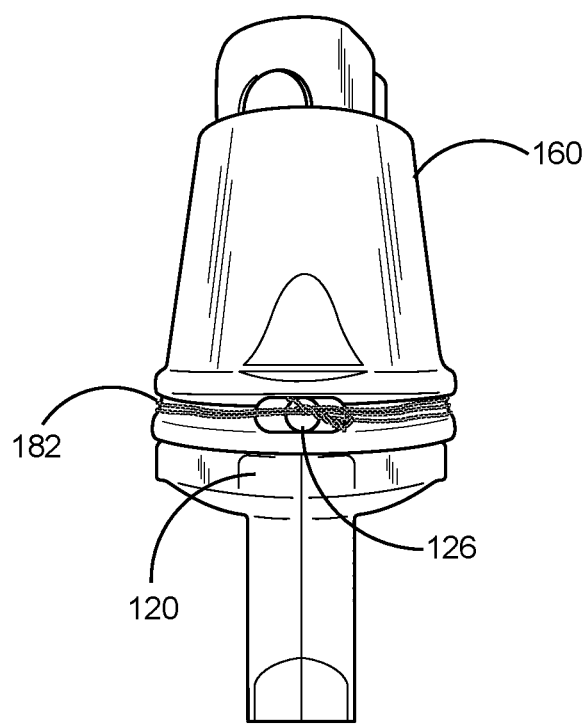
FIG. 7 presents a side view showing the installation of a lock wire 182 in the swivel device 100 of FIG. 1.

FIG. 7 presents a side view showing the installation of a lock wire 182 in the swivel device 100 of FIG. 1.

The lock wire 182 may be replaced with any mechanical means that is useful and practical for constraining the rotation and loosening of the collar 160 with respect to the swivel body 120 including, but not in a limiting sense, a cotter pin, a threaded fastener, or a thread-locking fluid.

In one preferred embodiment of the present invention, the clevis pin 180 may have an oblong cross-section, the thicker dimension of the cross-section being oriented in line with the chain-to-anchor load path, thereby more completely filling the space within the terminal link 210, tightening the interface tolerance between the clevis pin 180 and the terminal link 210, and maximizing the cross-section and strength of the clevis pin 180 and, therefore, the strength of the swivel device 100.

The structural elements of the swivel device 100 may be made from stainless steel for a combination of strength and corrosion resistance, from galvanized high-test steel for maximum strength, or from any other material that is appropriate to the intended use of the swivel device 100.

As will be appreciated by those with skill in the related arts, the elements of the present invention may be modified, interchanged, separated or combined, or additional elements added without departing from the spirit of the invention. The invention may be practiced in alternative embodiments other than those illustrated in the Figures. Such modifications, combinations, additions and alternatives are within the contemplation of the present invention. The exemplary embodiments and disclosed are not intended to limit the scope of this invention. Accordingly, the scope of the invention should be determined not by the embodiments illustrated, but by their legal equivalents, and shall be as broad as the claims will allow.

What is claimed is:

1. A swivel device comprising:
    a swivel chain connector having a swivel chain connector head, a swivel chain connector clevis, said swivel chain connector clevis forming a clevis channel and having two clevis pin holes oriented perpendicularly to the clevis channel, one clevis pin hole located on each side of said clevis channel;
    a swivel body comprising a first swivel body half, a second swivel body half, a head capture channel, an external thread, a connection flange, and a connection flange attachment hole;
    a collar having an internal thread; and
    a clevis pin to capture a terminal link of a marine anchor chain within said clevis channel, said clevis pin having a generally oblong cross-section, a thicker dimension of the cross-section being oriented in line with a chain-to-anchor load path.

2. The swivel device of claim 1, further comprising a lock wire, and wherein said swivel body comprises a lock wire passage, and said collar comprising a first collar locking channel and a second collar locking channel.

3. The swivel device of claim 1, further comprising a shackle affixed to said connection flange of said swivel body by means of a shackle pin.

4. The swivel device of claim 1, further comprising two chain link seats that function to mechanically seat the link adjacent to the terminal link of an anchor chain into said swivel chain connector.

5. The swivel device of claim 1, wherein said first swivel body half has one or more alignment pins, and said second swivel body half has one or more alignment holes, said one or more alignment pins designed and configured to engage said one or more alignment holes in order to maintain the relative positions of said first swivel body half and said second swivel body half to facilitate assembly of said swivel device.

6. A method of using a swivel device, comprising the steps of:
    a) providing a swivel device comprising:
        a swivel chain connector having a swivel chain connector head, a swivel chain connector clevis, said swivel chain connector clevis forming a clevis channel and having two clevis pin holes oriented perpendicularly to the clevis channel, one clevis pin hole located on each side of said clevis channel;
        a swivel body comprising a first swivel body half, a second swivel body half, a head capture channel, an external thread, a connection flange, and a connection flange attachment hole;
        a collar having an internal thread; and
        a clevis pin to capture a terminal link of a marine anchor chain within said clevis channel, said clevis pin having a generally oblong cross-section, a thicker dimension of the cross-section being oriented in line with a chain-to-anchor load path;
    b) providing a chain having a terminal link;
    c) inserting said terminal link of said chain into said channel of said swivel chain connector clevis;
    d) inserting said clevis pin though said swivel chain connector clevis, thereby capturing said terminal link within said swivel chain connector clevis;
    e) installing said first swivel body half and said second swivel body half onto said swivel chain connector such that said swivel chain connector head is captured within said pin capture channels of said first swivel body half and second swivel body half; and
    f) installing said collar over said first swivel body half and second swivel body half by engaging and screwing said collar internal thread onto said external thread portions of said first swivel body half and second swivel body half.

7. The method of claim 6 further comprising the steps of:
    a) providing a lock wire; and
    b) installing said lock wire into said swivel device, thereby preventing said collar from unthreading and loosening from said swivel body.

8. The method of claim 6 further comprising the steps of:
    a) providing a shackle having a shackle pin; and
    b) installing said shackle onto said connection flange of said swivel body half by means of said shackle pin.

9. The method of claim 6 further comprising the steps of:
    a) providing a marine anchor; and
    b) attaching said marine anchor to said swivel device.

\* \* \* \* \*